United States Patent
Stewart et al.

(10) Patent No.: US 10,621,330 B2
(45) Date of Patent: Apr. 14, 2020

(54) ALLOWING USE OF A TEST KEY FOR A BIOS INSTALLATION

(71) Applicant: HEWLETT-PACKARD DEVELOPMENT COMPANY, L.P., Houston, TX (US)

(72) Inventors: Christopher H. Stewart, Houston, TX (US); Stanley Hyojun Park, Houston, TX (US); Jayne E Scott, Houston, TX (US); Jeffrey Kevin Jeansonne, Houston, TX (US); Lan Wang, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 213 days.

(21) Appl. No.: 15/118,578

(22) PCT Filed: Mar. 28, 2014

(86) PCT No.: PCT/US2014/032258
§ 371 (c)(1),
(2) Date: Aug. 12, 2016

(87) PCT Pub. No.: WO2015/147879
PCT Pub. Date: Oct. 1, 2015

(65) Prior Publication Data
US 2017/0053111 A1    Feb. 23, 2017

(51) Int. Cl.
*G06F 21/44* (2013.01)
*G06F 8/654* (2018.01)
(Continued)

(52) U.S. Cl.
CPC .......... *G06F 21/44* (2013.01); *G06F 8/61* (2013.01); *G06F 8/654* (2018.02); *G06F 9/4406* (2013.01);
(Continued)

(58) Field of Classification Search
CPC ..................................... G06F 21/44
See application file for complete search history.

(56) References Cited

U.S. PATENT DOCUMENTS 7,412,053 B1    8/2008  Lyle
7,543,277 B1 *  6/2009  Righi .............. G06F 11/362
                                          709/221
(Continued)

FOREIGN PATENT DOCUMENTS

CN    101965570 A    2/2011
TW    201227300 A    7/2012
TW    201342106 A1   10/2013

OTHER PUBLICATIONS

Leyden, J., AMI PC Firmware Upgrade Scare: The Global Security Meltdown That Wasn't, (Web Page), Apr. 11, 2013, available at https://www.theregister.co.uk/Print/2013/04/11/ami_uefi_key_leak. (Year: 2013).*

(Continued)

*Primary Examiner* — Kim Huynh
*Assistant Examiner* — Kevin M Stewart
(74) *Attorney, Agent, or Firm* — HPI Patent Department

(57) ABSTRACT

Examples herein disclose a command to control a use of a test key for installation of a test basic input output system (BIOS). The examples validate a command and replace at least a portion of a production BIOS with the test BIOS based on an allowance of the test key.

13 Claims, 6 Drawing Sheets

(51) Int. Cl.
*G06F 21/57* (2013.01)
*G06F 8/61* (2018.01)
*G06F 9/4401* (2018.01)
*G06F 21/60* (2013.01)

(52) U.S. Cl.
CPC .......... *G06F 21/575* (2013.01); *G06F 21/602* (2013.01); *G06F 2221/033* (2013.01); *G06F 2221/2147* (2013.01)

(56) References Cited

U.S. PATENT DOCUMENTS

| | | |
|---|---|---|
| 7,890,726 B1 | 2/2011 | Falik et al. |
| 2002/0087877 A1* | 7/2002 | Grawrock ............... G06F 21/34 726/26 |
| 2002/0169976 A1* | 11/2002 | Schelling .............. G06F 21/572 726/17 |
| 2005/0125652 A1 | 6/2005 | Singer et al. |
| 2006/0015776 A1 | 1/2006 | Lee |
| 2006/0143475 A1* | 6/2006 | Herbert ............... H04L 63/0428 713/191 |
| 2006/0194603 A1* | 8/2006 | Rudelic .................. G06F 21/51 455/550.1 |
| 2008/0163001 A1 | 7/2008 | Ko et al. |
| 2010/0287363 A1* | 11/2010 | Thorsen ................ G06F 21/575 713/2 |
| 2011/0040960 A1* | 2/2011 | Deierling .............. G06F 21/572 713/2 |
| 2011/0113181 A1* | 5/2011 | Piwonka ................... G06F 8/65 711/102 |
| 2011/0119474 A1 | 5/2011 | Singh et al. |
| 2013/0031531 A1 | 1/2013 | Keynes et al. |
| 2013/0031541 A1* | 1/2013 | Wilks ..................... G06F 8/654 717/176 |
| 2014/0331037 A1* | 11/2014 | Lewis ................... G06F 9/4401 713/2 |
| 2015/0149989 A1* | 5/2015 | Lu ........................... G06F 8/658 717/170 |

OTHER PUBLICATIONS

"ESLAudrt Access Control System Beta Test Firmware Updates," Revision A, Mar. 25, 2013, available from American Security Products Co., Fontana, Ca. (Year: 2013).*

SecureBoot, (Web Page), Apr. 15, 2013, 18 pps. https://wiki.ubuntu.com/SecurityTeam/SecureBoot.

* cited by examiner

ALLOWING USE OF A TEST KEY FOR A BIOS INSTALLATION

BACKGROUND

A computing system can include code to perform various startup functions of the computing device. This code may include Basic Input/Output System (BIOS) code. The BIOS code may initialize and test hardware of the computing device. Additionally, the BIOS code may load bootstrap code and/or an operating system from a memory device of the computing device.

BRIEF DESCRIPTION OF THE DRAWINGS

In the accompanying drawings, like numerals refer to like components or blocks. The following detailed description references the drawings, wherein.

DETAILED DESCRIPTION

Installation of BIOS code into a computing device may occur at a manufacturing level or post-manufacturing level and may be referred to throughout this document as production BIOS. The production BIOS may be associated with a production digital signature and a production key pair for validation upon initialization. Once production BIOS is installed it may be infeasible to include a modification to the production BIOS. The modification may be referred to as test BIOS throughout this document. Particular regions of the production BIOS may not be modified unless validation of the test BIOS occurs; however, the computing device may use the production key pair to validate the test BIOS. This leads to the invalidation of the test BIOS, thus not allowing installation of the test BIOS to modify the production BIOS. Thus there may not be an implementation to recognize a digital signature associated with the test BIOS.

To address these issues, examples disclosed herein a flexible approach to provide post-production developments to production BIOS. The examples disclose a command to control a use of a test key for validating the test BIOS prior to installation to replace at least a portion of the production BIOS. Validation of the test BIOS ensures a secure environment and prevents tampering by unauthorized sources. Additionally, such post-production developments may include updates, debugging, internal testing, etc. In this manner, the test BIOS may provide updates to production BIOS which may already be installed. Further, the production BIOS may be developed in a controlled manner from an external source in communication with the computing device. This further provides updates to the BIOS in a seamless manner as the computing device may receive updates from a remote location (e.g., external source).

In another example discussed herein, the command may include the test key for validating the test BIOS prior to installation. Additionally in this example, a controller within the computing device may validate the command with a key different from the test key. In this example, the command and the test BIOS are transmitted from an external source and are each digitally signed with different private keys at the external source. For example, the command is digitally signed with a production private key while the test BIOS digitally signed with a test private key. This provides an additional security feature as both the command and the test BIOS may be validated prior to installation of the test BIOS.

In summary, examples disclosed herein provide flexibility for installing a test BIOS on a computing device when a production bios may already be installed on the computing device. Additionally, examples disclosed herein provide an implementation to validate post-production modifications to the production BIOS for updating, developing, debugging, and/or internal testing of the BIOS.

Figure 1:
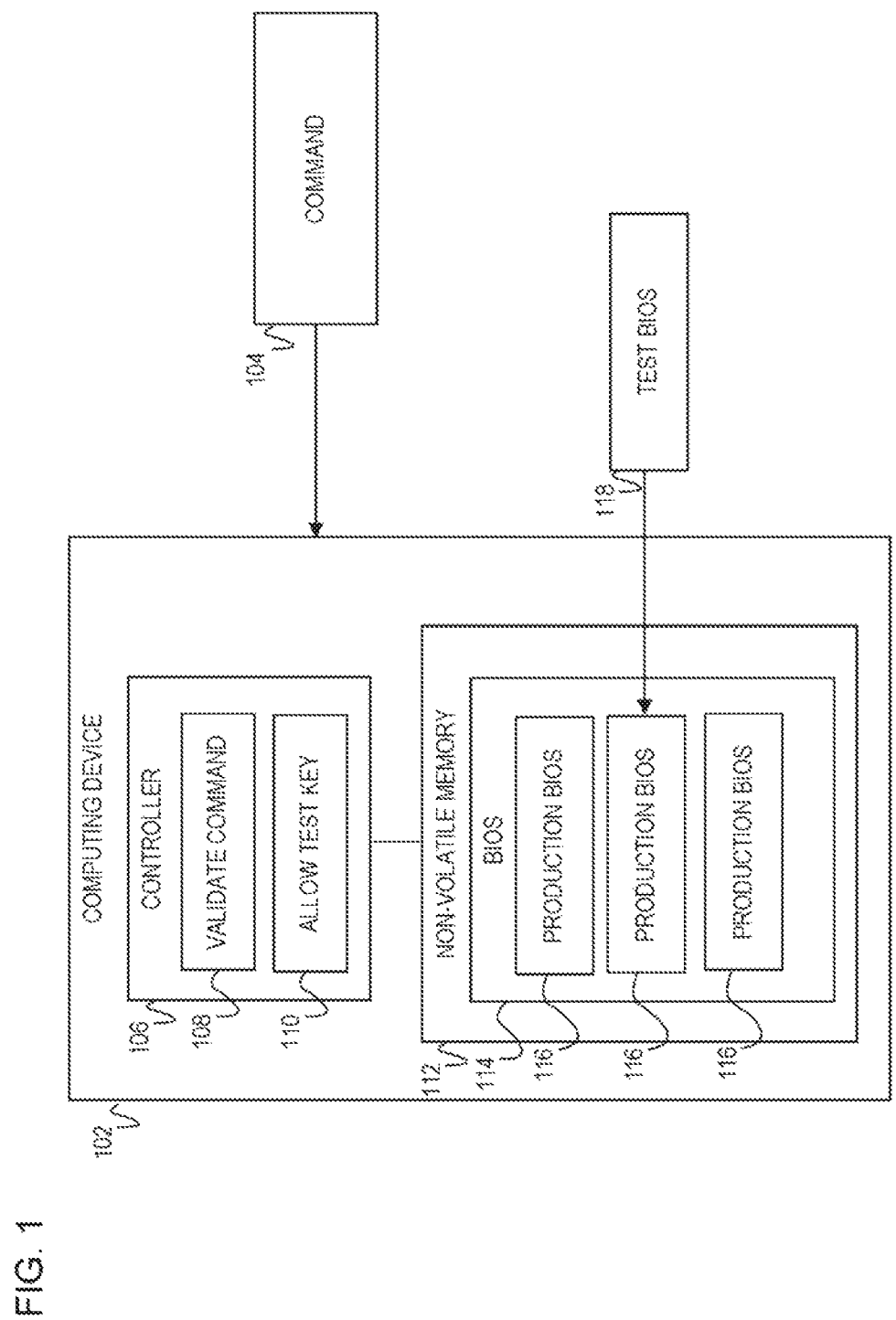
FIG. 1 is a block diagram of an example computing device for receiving a command for validation by a controller and based on the validation of the command, the controller allows a test key for installation of a test BIOS to replace at least a portion of a production BIOS within a non-volatile memory.

Referring now to the figures, FIG. 1 is a block diagram of an example computing device 102 for receiving a command 104 to control a use of a test key for installation of a test BIOS 118. The computing device 102 includes a controller 106 to validate the command at module 108 and allow the test key at module 110 based on the validation of the command. Additionally, upon the allowance of the test key at module 110, the computing device 102 replaces at least a portion of production BIOS 116 within a non-volatile memory 112 with the test BIOS 118. The production BIOS 116 and the test BIOS 118 represent different levels of the BIOS 114. For example, the production BIOS 116 is considered the BIOS 114 as installed at a manufacturing level or post-manufacturing. The test BIOS 118 is considered a modification to the production BIOS 116. As such, the test BIOS 118 may include an update, development, or debug to the production BIOS 116. In this manner, installing the test BIOS 118 to replace the portion of the production BIOS 116 provides post-production developments. Enabling the test BIOS 118 to replace the portion of production BIOS 118 provides flexibility to the BIOS 114 for providing updates, etc. As such, the production BIOS may be developed in a controlled manner from a remote location.

The computing device 102 is an electronic device including the controller 106 and the non-volatile memory 112. As such, implementations of the computing device 102 include a mobile device, client device, personal computer, desktop computer, laptop, tablet, portable device, video game console, or other type of electronic device. The computing device 102 may receive the command 104 as part of a data package transmitted by an external source (not illustrated). The data package may include the command 104 and a test BIOS file. The test BIOS file includes the test BIOS code (i.e., test BIOS) and/or a boot block corresponding to the test BIOS for replacing the corresponding portion of production BIOS 116. For example, the test BIOS may include the boot block for validation by the test public key prior to installation of the test BIOS. In this implementation, the command 104 includes the test key while the test BIOS file includes the test BIOS code and/or a boot block of the test BIOS 118. This implementation is discussed in detail in later figures. As part of the data package, both the command 104 and the test BIOS 118 include digital signatures by the external source; however the command 104 and the test BIOS 118 are digitally signed with different private keys. For example, the command 104 is digitally signed with a production private key while the test BIOS 118 is digitally signed with a test private key. The digital signature associated with the command 104 is validated using the production private key and the digital signature associated with the test BIOS 118 is validated using the test public key which is transmitted as part of the command 104. This implementation is discussed in detail in a later figure.

The command 104 is a request from the external source to the computing device 102 to direct the computing device 102 to allow the use of the test key within the command 104 for verifying the test BIOS 118 prior to installation. In one implementation, the command 104 is associated with the digital signature generated by the external source. In this implementation, the computing device 102 receives a cryptographic key corresponding to the digital signature prior to receipt of the command 104. For authentication and/or verification of the command 104, the computing device 102 uses this cryptographic key to verify the digital signature associated with the command 104. The computing device 102 illustrates a computing system which may communicate with an external source (not illustrated) over a network such as a wide area network (WAN), local area network (LAN), personal area network (PAN), mesh network, mobile device network, or other type of network capable of transmitting the command 104 to the computing device 102. In another implementation, the external source communicates directly with the computing device 102 by coming within close proximity computing device 102.

The controller 106 includes modules 108 and 110 to validate the command received by the computing device 102 and in turn upon the validation of the command, the controller 106 allows the use of the test key. The test key is obtained upon the validation of the command at module 108 and transmitted to an embedded controller (not illustrated). The embedded controller uses the test key to validate the digital signature appended to the test BIOS 118 prior to installation to the non-volatile memory 112. As explained earlier, the command may be sent as part of the data package and as such the command may include the test key and the computing device 102 may obtain the test key upon the validation of the digital signature associated with the command 104. Implementations of the controller 106 include a processor, electronic device, computing system, microprocessor, microchip, chipset, electronic circuit, semiconductor, microcontroller, central processing unit (CPU), or other type of processing system capable of validating the command at module 108 and allowing the use of the test key at module 110 based on the validation of the command. In one implementation, the controller 106 may include an embedded controller which receives the test key based on the validation of the command at module 108. In another implementation, the controller 106 is a different controller from the embedded controller and as such based on the validation of the command at module 108, the controller 106 transmits the test key and the test BIOS file to the embedded controller for verification of the test BIOS 118 prior to installation.

Modules 108 and 110 validate the digital signature associated with the command 104 at the external source and based on the validation, the controller 106 allows the test key. At modules 108 and 110, upon the validation of the command, the test key may be obtained from the command 104. In this implementation, the test key is transmitted in the data package as part of the command 104. Thus upon the verification of the digital signature associated with the command 104, the controller may retrieve the test key from the command 104. In one implementation, upon retrieval of the test key, the controller 106 transmits the test key and the test BIOS file to an embedded controller. The embedded controller uses the test key to verify the digital signature associated with the test BIOS file prior to installing the test BIOS 118. The modules 108 and 110 may include an instruction, set of instructions, process, operation, logic, technique, function, firmware, and/or software executable by the controller 106 to verify the command 104 for allowance of the test key for verifying the test BIOS.

The non-volatile memory 112 is a storage area within the computing device 102 which maintains the BIOS 114. The non-volatile memory 112 includes the BIOS 114 which further includes the production BIOS 116. One of the portions of the production BIOS 116 may be replaced within the non-volatile memory 112 with the installation of the test BIOS 118. The portion of the production BIOS 116 correspond to the test BIOS 118 in the sense the test BIOS 118 may be similar or analogous in function, purpose, and/or amount to the portion of the production BIOS 116 which the test BIOS 118 replaces. In this manner, the test BIOS 118 updates, develops, and/or debugs the portion of the production BIOS 116. The non-volatile memory 112 is the memory within the computing device 102 which maintains the BIOS 114 and other data even though the computing device 102 is not powered on. As such, implementations of the non-volatile memory 112 include read-only memory, flash memory, ferroelectric memory, ferroelectric RAM, magnetic storage memory, nanodrive, storage drive, memory component, or any combination of such memory components to maintain the BIOS 114. In one implementation, the non-volatile memory 112 may further include the corresponding public key to validate the digital signature of the command 104.

The BIOS 114 includes the production BIOS 116. Although FIG. 1 illustrates the BIOS 114 as separate from the production BIOS 116, this was done for illustration purposes and not for limitation purposes. For example, the BIOS 114 and the production BIOS 116 may be included as one component.

The production BIOS 116 is the level of BIOS 114 which exists on the computing device 102 prior to installation of the test BIOS 118. In one implementation, the production BIOS 116 is previously installed on the computing device 102 prior to the installation of the test BIOS 118. As explained earlier, the production BIOS 116 may include the BIOS as installed by the manufacturer.

The test BIOS 118 is a modification to the corresponding portion of the production BIOS 116. The modification may include an update, development, and/or debugging aspect to the production BIOS 116. The test BIOS 118 includes the BIOS code for replacing that portion of the production BIOS 116. As explained earlier, the test BIOS 118 may be included as part of the test BIOS file within the data package from the external source to the computing device 102. As such, the test BIOS file may include the test BIOS code and/or a boot block of data for the test BIOS. In this implementation, the test BIOS file and/or the test BIOS 118 is associated with a digital signature at the external source. The corresponding key pair (i.e., test public key) used to verify the digital signature is obtained from the command 104 transmitted to the computing device 102 based on the validation of the command at module 108. In this sense, the command 104 may control the test key which is used to validate the digital signature associated with the test BIOS 118 prior to installation in the non-volatile memory 112. This implementation is described in detail in a later figure. Additionally, although FIG. 1 illustrates the test BIOS 118 as transmitted separately from the command 104, this was done for illustration purposes as the test BIOS 118 may be transmitted together with the command 104 as part of the data package from the external source.

Figure 2:
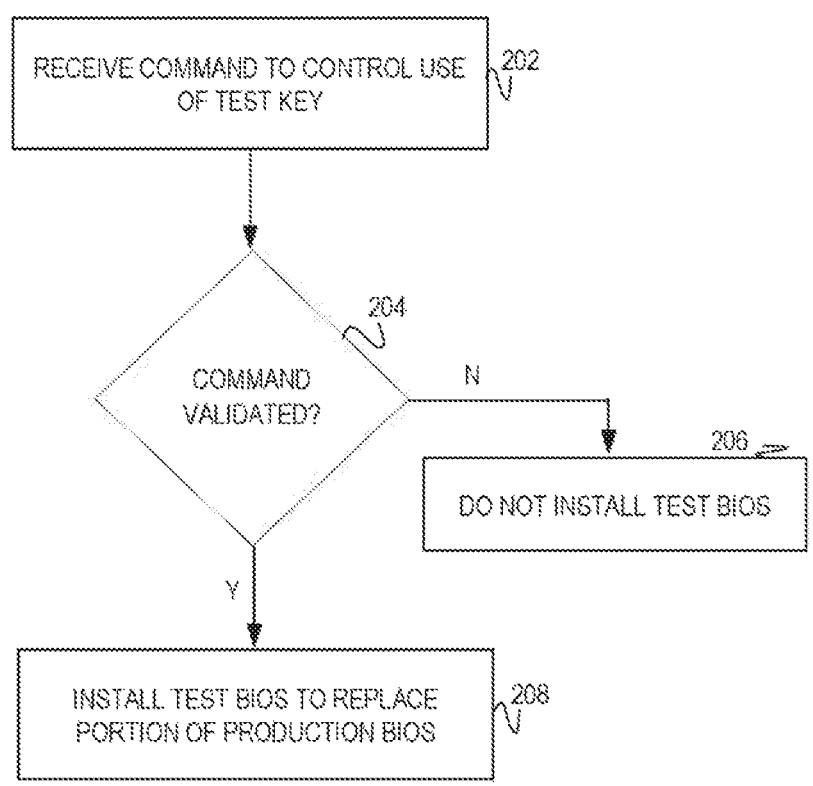
FIG. 2 is a block diagram of example method executable by a computing device to receive a command to control use of a test key and based on the validation of the command, the method proceeds to install a test BIOS to replace at least a portion of production BIOS.

FIG. 2 is a block diagram of an example method executable by a computing device to receive a command for controlling a use of a test key. Upon receiving the command, the computing device validates the command to install a test BIOS to replace a portion of a production BIOS. If the computing device does not validate the command (e.g., invalidates the command), the computing device does not install the test BIOS. The production BIOS and the test BIOS represent different levels of BIOS. For example, the production BIOS is considered the BIOS may be installed at a manufacturing level signed with a production private key or may include a post-manufacturing BIOS signed with the production private key. The test BIOS is considered a modification to the production BIOS signed with a test private key and as such may include an update, development, or debug to the production BIOS. Enabling the test BIOS to replace the portion of production BIOS provides flexibility to the BIOS once it may be in post-production mode. As such, the production BIOS may be developed in a controlled manner from an external source in communication with the computing device. This further provides updates to the BIOS in a seamless manner as the computing device may receive updates from a remote location (e.g., external source). Further, installing the test BIOS to replace the portion of the production BIOS enables access to the BIOS for updates, etc. in the computing device which may be placed in a locked programmed mode. Furthermore, the computing device and the external source may utilize different key pairs, each key pair represents the validation at particular levels of the BIOS. In this implementation, the external and the computing device utilize two different key pairs for signatures and verification. For example, the external source may sign the command with a production private key and the computing device validates the signed command with the corresponding public key (i.e., production public key). Additionally in this example, the external source may sign the test BIOS code with a test private key and the computing device may validate the test BIOS with the corresponding public key (i.e., test public key). This example is explained in further detail in a later figure. Validating the digital signatures of the test BIOS file and the command provide a secure environment to safeguard the BIOS against attacks. In discussing FIG. 2, references may be made to the components in FIG. 1 to provide contextual examples. For example, the computing device 102 executes operations 202-208 to validate the command for allow the use of the test key for installation of the test BIOS. In another example, the controller 106 as in FIG. 1 executes operations 202-208. Further, although FIG. 2 is described as implemented by the computing device, it may be executed on other suitable components. For example, FIG. 2 may be implemented in the form of executable instructions on a machine-readable storage medium 604 as in FIG. 6.

At operation 202, the computing device receives the command for controlling the use of the test key. In one implementation, the remote source (e.g., the external source) transmits the command. In another implementation, the command may be transmitted by an external drive such as a flash drive which may be in communication with the computing device. The command is transmitted as part of a data package to the computing device. The data package may include the command and the test BIOS file. The command includes the test key while the test BIOS file includes the test BIOS code and/or a boot block of the test BIOS. As part of the data package, both the command and the test BIOS file include digital signatures by the external source; however the command the test BIOS file are digitally signed with different private keys. For example, the command is digitally signed with the production private key while the test BIOS file is digitally signed with the test private key. The digital signature associated with the command is validated at operation 204 using the production private key. In another implementation, the digital signature associated with the test BIOS file is validated using the test public key which is transmitted as part of the command. This implementation is discussed in detail in a later figure.

At operation 204, the computing device validates the command received as part of the data package at operation 202. As explained earlier, the command may be appended with the digital signature at the external source, thus the computing device validates the digital signature at operation 202. Upon the validation of the command, the computing device may retrieve the test key and transmit the test key and the test BIOS file to an embedded controller. In this implementation, the embedded controller initializes the test BIOS file through the boot block and uses the test key to validate the signature appended to the test BIOS file. In this implementation, a processing unit within the computing device may obtain the command for validation and transmit the boot block and the test key to the embedded controller. In another implementation, the computing device utilizes the production public key to cryptographically validate the command. If the computing device validates the command, the method proceeds to operation 208 and installs the test BIOS to replace the portion of the production BIOS. If the computing device fails the validation of the command, the method proceeds to operation 206 and does not install the test BIOS.

At operation 206, if the command fails to validate at operation 204, the computing device does not install the test BIOS. If the computing device determines the command fails or is invalidated, this may indicate the computing device does not have access to the corresponding key pair which enables the validation of the digital signature appended to the command. This prevents unauthorized devices to gain access to the test key and/or the test BIOS.

At operation 208, upon the validation of the command at operation 204, the computing device installs the test BIOS code within the test BIOS file to replace the portion of the production BIOS. The portion of the production BIOS corresponds to the test BIOS code, meaning the test BIOS code may be similar or analogous in function, purpose, and/or amount to the portion of the production BIOS. In this manner, the test BIOS updates, develops, and/or debugs the portion of the production BIOS. In one implementation the embedded controller uses the test key received upon the command validation to validate the digital signature appended to the test BIOS file. In this implementation, upon the validation of the digital signature using the test key, the embedded controller obtains the test BIOS code within the test BIOS file and replaces the portion of the production BIOS.

Figure 3:
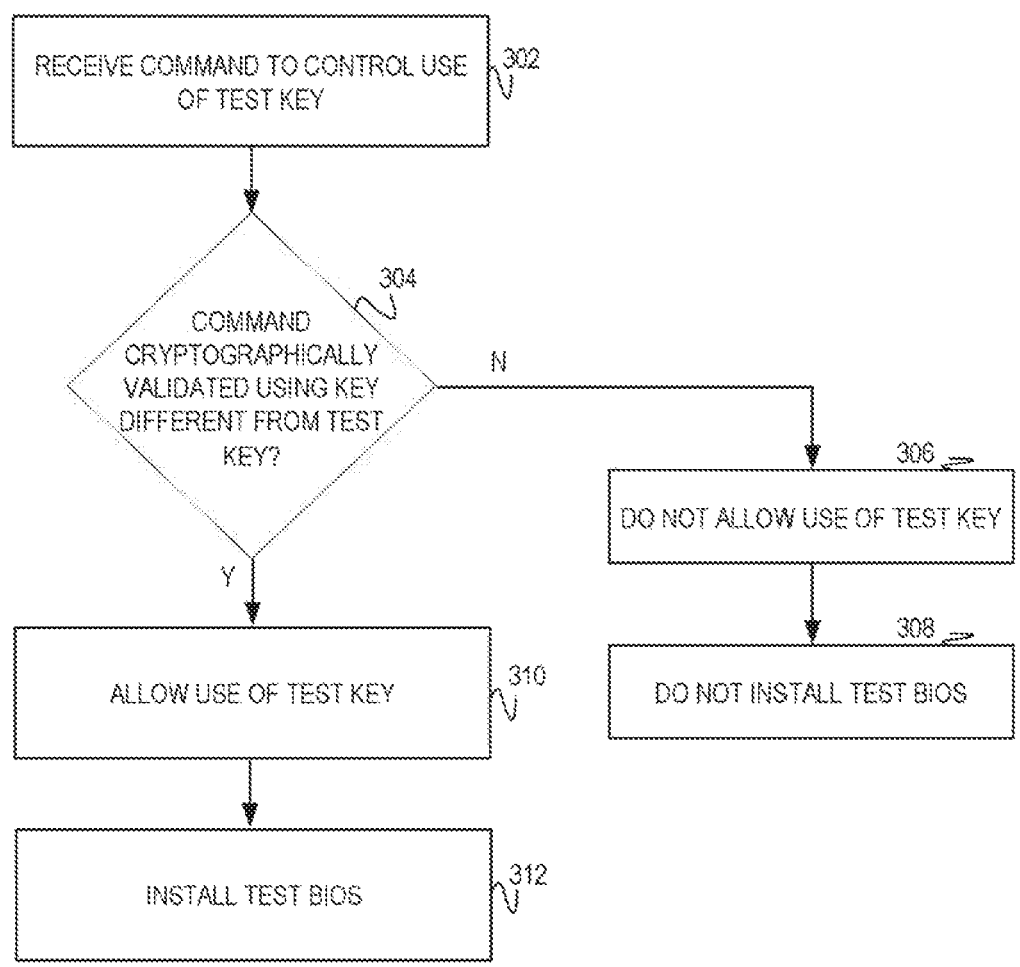
FIG. 3 is a flowchart of an example method executable by a computing device to receive a command for controlling a use of a test key, the method cryptographically validates the command using a key different than the test key and based on the validation, the method allows the use of the test key for installation of a test BIOS.

FIG. 3 is a flowchart of an example method executable by a computing device to receive a command for cryptographic validation. Based on the validation of the command, the computing device allows use of a test key and installs a test BIOS to replace a portion of production BIOS. The computing device cryptographically validates the command with a key different than the test key. In this manner, an external source and the computing device utilize two different key pairs for signatures and verifications. For example, the external source may sign the command with a production private key and the computing device validates the signed command with the corresponding public key (i.e., production public key). Additionally in this example, the external source may sign the test BIOS with a test private key and the computing device may validate the test BIOS with the corresponding public key (i.e., test public key). This example is explained in further detail in later figures. The different key pairs including the production key pair and the test key pair each represent the validation at the particular levels of BIOS. For example, the production key pair validates the command and the production BIOS while the test key pair validates the test BIOS. In discussing FIG. 3, references may be made to the components in FIG. 1 to provide contextual examples. For example, the computing device 102 executes operations 302-312 to validate the command for allow the use of the test key for installation of the test BIOS. In another example, the controller 106 as in FIG. 1 executes operations 302-312. Further, although FIG. 3 is described as implemented by the computing device, it may be executed on other suitable components. For example, FIG. 3 may be implemented in the form of executable instructions on a machine-readable storage medium 604 as in FIG. 6.

At operation 302, the computing device receives the command to control the use of the test key. In this manner, the command may instruct the computing device to allow the use of the test key upon validation at operation 304. The test key is used to validate the test BIOS prior to installing the test BIOS to replace the production BIOS. Operation 302 includes the external source transmitting a data package to the computing device. The data package may include the command, the test key as part of the command, a test BIOS file which may include test BIOS code, and/or the boot block to the test BIOS code. In this implementation, a flag may separate various components within the data package. For example, the flag may separate the command, the test key, the test BIOS file, and/or the boot block of the test BIOS. The boot block implementation is explained in detail in a later figure. Operation 302 may be similar in functionality to operation 202 as in FIG. 2.

At operation 304, the computing device validates the command received at operation 302. The computing device validates the command through cryptographic validation using the production key pair which is different from the test key. Operation 304 is a specific type of operation in which the computing device may validate the command received at operation 302. In this operation, the computing device may receive the data package including the command and the test key. In one implementation, the data package portion including the command which includes the test key, the command is signed by the external source using the production private key. Thus when the computing device receives the data package with the command the computing device utilizes the production public key to verify the digital signature. Operation 304 is a specific type of operation in which the computing device may validate the command.

At operation 306, if the computing device deems the command is not validated at operation 304, the computing device does not allow the use of the test key. If the computing device deems the command is invalidated, the method may proceed to operation 306 and/or 308. In one implementation, upon not allowing the test key, the computing device may further not install the test BIOS at operation 308.

At operation 308, the computing device does not install the test BIOS. Preventing the installing of the test BIOS may not allow updates to replace the portion of the production BIOS. This provides a rigid experience in the sense the BIOS may not receive updates and/or developments without replacing the BIOS and/or the component with the BIOS. Operation 308 may be similar in functionality to operation 206 as in FIG. 2.

At operation 310, upon validation of the command at operation 304, the computing device allows the use of the test key for validating the test BIOS file. In one implementation, the test key is retrieved from the command once the command has been validated at operation 304. In this implementation, the data package received at operation 302 may include flags indicating to the computing device the different components of the data package. The flags may indicate separation between the command, the test key, and the test BIOS. Upon validating the command at operation 304, the computing device may retrieve the test key as part of the command and transmit the test key to an embedded controller to validate an initialization or boot block of the test BIOS file prior to installing the test BIOS code.

At operation 312, the computing device installs the test BIOS to replace the portion of production BIOS. Installing the test BIOS for replacing the portion of production BIOS enables the computing device to receive updates and/or developments to a previously installed BIOS. This provides additional flexibility as providing post-production developments to the BIOS. Operation 312 may be similar in functionality to operation 208 as in FIG. 2.

Figure 4:
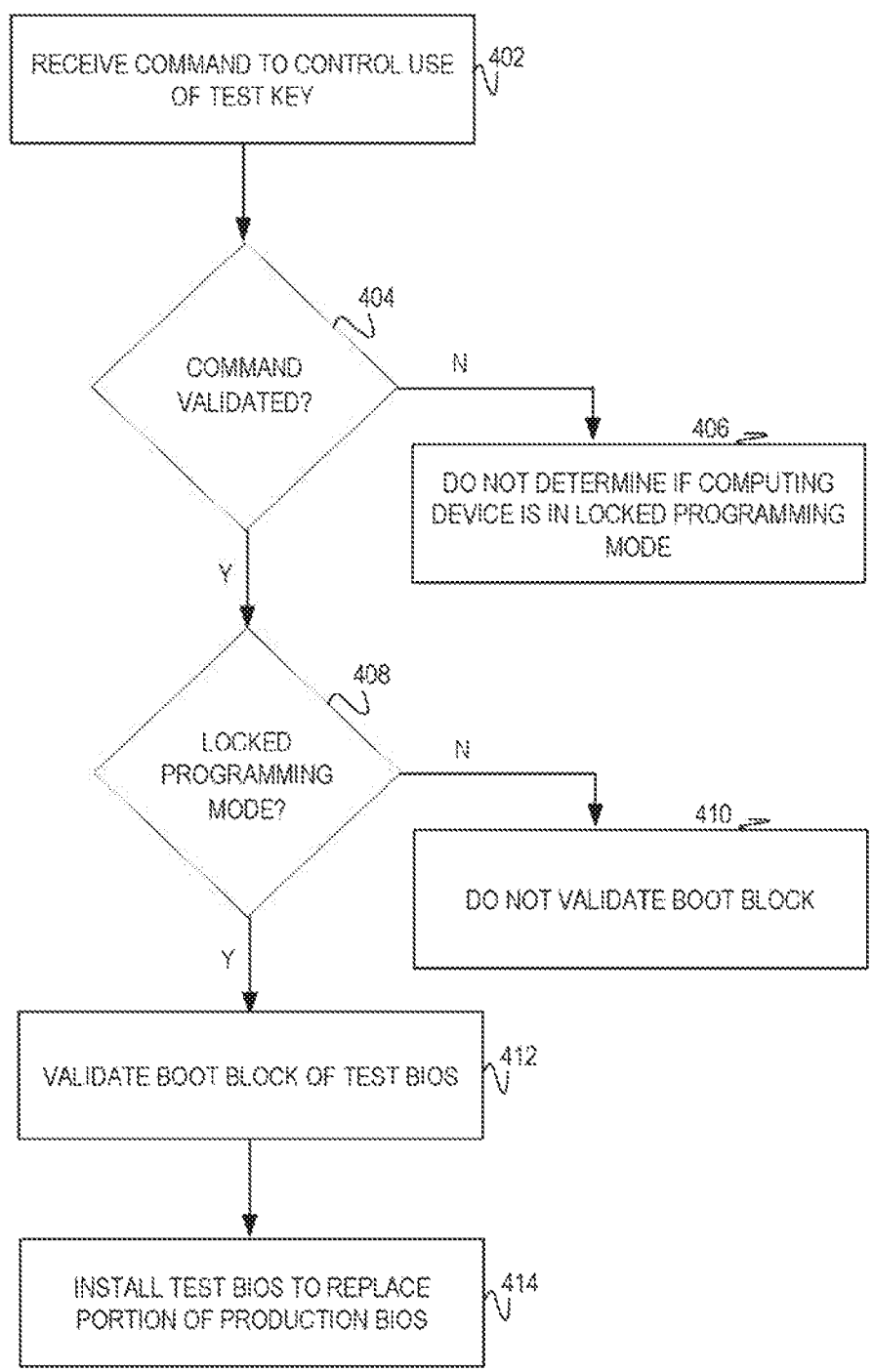
FIG. 4 is a flowchart of an example method executable by a computing device to validate a command for controlling a use of a test key and determining whether the computing device is in a locked programming mode prior to installation of a test BIOS.

FIG. 4 is a flowchart of an example method executable by a computing device to validate a command for controlling a use of test key. Upon validation of the command, the method may determine whether the computing device is in a locked programming mode prior to installation of a test BIOS. A programming mode is a mode in which code is written into the computing device at the manufacturer to secure data items. Such default code may include default settings, a serial number, a universally unique identifier, etc. During the unlock of the programming mode, the computing device is programmed with the code. Upon the writing the code into the computing device, the manufacturer may lock the device to secure the data items, such as the serial number. Determining whether the computing device is in the locked programming mode ensures the computing device is in a secure mode prior to installing the test BIOS. This ensures the BIOS has not been tampered with and/or attacked. Upon determining the computing device is in the locked programming mode, the method may proceed to validate a boot block of the test BIOS. The boot block is startup code which enables the computing device to boot strap loads such as memory drivers and initializes lower level components within the BIOS before initializing higher level items in a driver execution environment (DXE). Such higher level items in DXE may include a microprocessor and/or or other embedded circuits. In this manner, validating the boot block of the test BIOS prior to installing the test BIOS to replace the portion of the production BIOS protects the DXE region since control may never be handed to the DXE if the boot block corresponding to the test BIOS is invalidated. In discussing FIG. 4, references may be made to the components in FIG. 1 to provide contextual examples. For example, the computing device 102 executes operations 402-414 to validate the command for allow the use of the test key for installation of the test BIOS. In another example, the controller 106 as in FIG. 1 executes operations 402-414. Further, although FIG. 4 is described as implemented by the computing device, it may be executed on other suitable components. For example, FIG. 4 may be implemented in the form of executable instructions on a machine-readable storage medium 604 as in FIG. 6.

At operation 402, the computing device receives the command from a source external to the computing device. The command is associated with the test key and transmitted in addition to the test BIOS. In this implementation, the command is transmitted in a data package with the test BIOS and the test key. In the data package, the command and the test BIOS are signed using two different private keys at the external source. For example, the command may be signed by a production private key at the external source while the test BIOS may be signed by a test private key prior to transmission to the computing device. The computing device maintains a corresponding key to the production private key (i.e., production public key) for validation of the signature of the command at operation 404. To obtain the corresponding key pair to the test private key, the computing device validates the command and retrieves the test public key from the validated command. For example, the data package may include a string of data values, references, and/or characters. As such, the string may include a flag indicating separation from the command and the test key and the test BIOS code. In this example, the computing device may validate the command and recognize the flag to obtain the test key from the data package. In one implementation, the external source may include a portable device in communication with the computing device. The external source may be managed by the manufacturer thus enabling the privacy of the production private key for the signature of the command. Upon arrival, the computing device validates the signed command with the corresponding public key to the private production key at operation 404. Operation 402 may be similar in functionality to operations 202 and 302 as in FIGS. 2-3.

At operation 404, the computing device validates the command received at operation 402. Upon validating the command, the method may proceed to operation 408 to determine whether the computing device is in the locked programming mode. If the command is not validated (i.e., invalidated), the method proceeds to operation 406 and does not determine if the computing device is in the locked programming mode. Operation 404 may be similar in functionality to operation 204 as in FIG. 2.

At operation 406, if the command is not validated (i.e., invalidated), the method may proceed to operation 406 and may not determine whether the computing device is in the locked programming mode. In alternative, if the command is invalidated, this indicates the computing device may not have the corresponding key pair and may be unauthorized to validate the command.

At operation 408, the computing device may determine whether the computing device is in the locked programming mode. If the computing device is in the locked programming mode, the method may proceed to operation 412 to validate a boot block of the test BIOS. If the computing device is not in the locked programming mode (i.e., unlocked programming mode), the method may stop at operation 410 and does not validate the boot block of the test BIOS.

At operation 410, the computing device does not validate the boot block corresponding to the test BIOS. In one implementation, the computing device may determine whether the computing device is the unlocked programming mode. In the unlocked programming mode, the computing device allows much of the programming default factory settings such as a serial number, etc. During the unlocked mode, the security of the BIOS may be unsecure as data may be overwritten during this mode.

At operation 412, the computing device validates the boot block of data of the test BIOS using the test key retrieved at operation 404. At this operation, the boot block operates as the initialization and/or boot strap data to the test BIOS. In this manner, the computing device validates the initialization of the test BIOS prior to executing the other components of the test BIOS. In this implementation, the data package received by the computing device includes the command and the test key as part of the command. In addition, the data package also includes the test BIOS code and the boot block as part of the test BIOS code. Transmitting the boot block of the test BIOS code as part of the data package enables the computing device to validate the initialization of the test BIOS. In another implementation, the test BIOS may include the boot block meaning the update of the production BIOS is the boot block. In this example, the boot block of the production BIOS may be replaced by the boot block of the test BIOS. At operation 412, the computing device may transmit the test BIOS received in the data package received at operation 402 to the embedded controller. In one implementation, the computing device may be rebooted prior to validation of the boot block and/or determining whether the computing device is in the locked programming mode at operation 408. In another implementation, upon validating the boot block of data corresponding to the test BIOS, the computing device may hand control over to the DXE to initialize the higher level components.

At operation 414, upon validating the boot block corresponding to the test BIOS as at operation 412, the method proceeds to install the test BIOS to replace the corresponding portion of the production BIOS. Operation 414 may be similar in functionality to operations 208 and 312 as in FIGS. 2-3.

Figure 5:
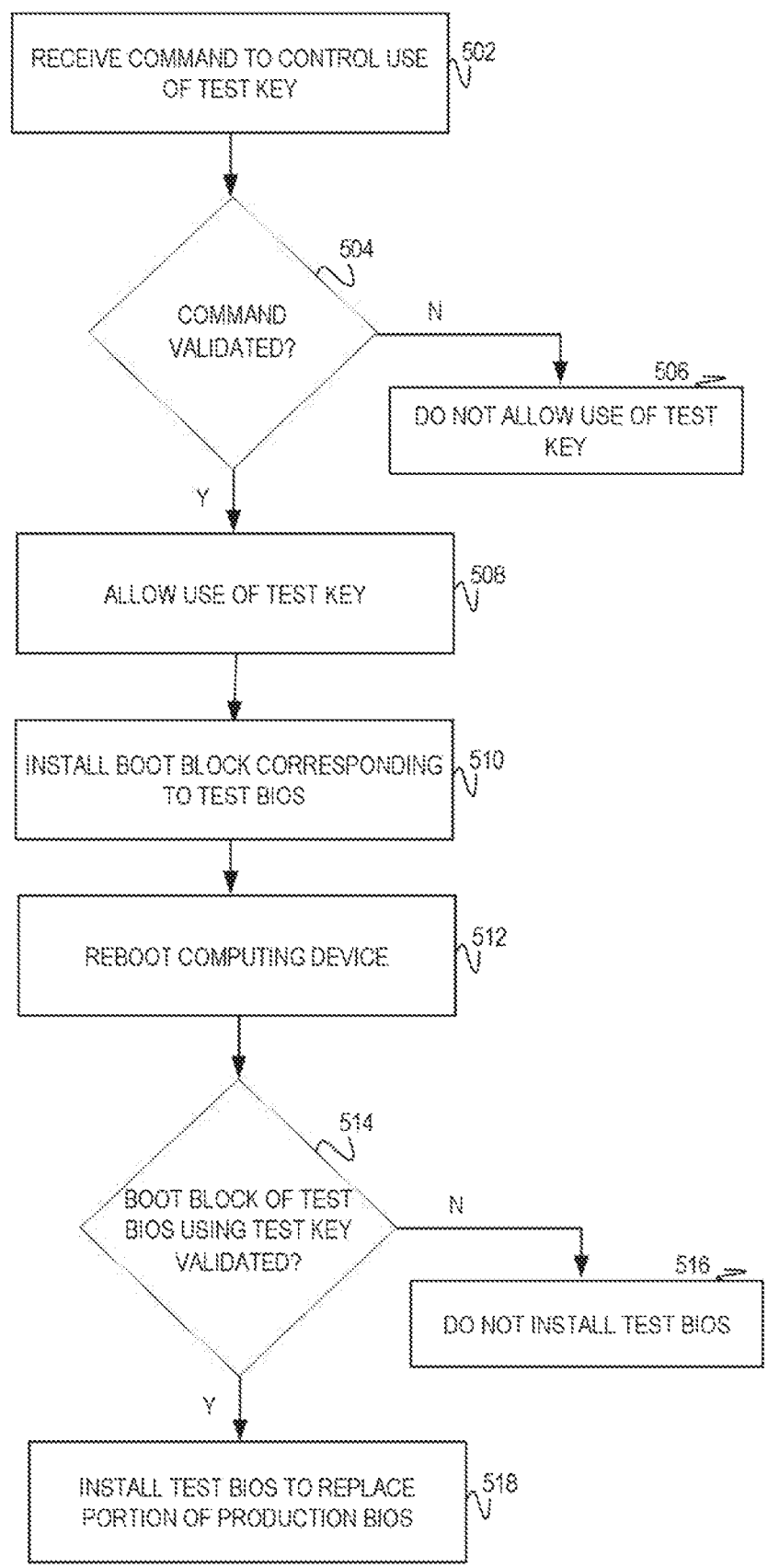
FIG. 5 is a flowchart of an example method executable by a computing device to validate a command for controlling a use of a test key, rebooting the computing device upon the validation of the command, and validating a boot block of a test BIOS using the test key prior to installation of the test BIOS.

FIG. 5 is a flowchart of an example method executable by a computing device to validate a command for allowing a use of a test key and based on the allowance of the test key, the computing device installs a boot block corresponding to the test BIOS. Upon the installation of the boot block, the computing device reboots. The computing device may then validate the boot block of test BIOS using the test key. Upon validation of the boot block, the computing device installs the test BIOS to replace at least a portion of a production BIOS within a memory. The command is transmitted with the test key by an external source to the computing device. Transmitting the command with the test key enables the computing device to retrieve the test key for use based upon the validation of the command. In addition to the test key, the source also transmits the boot block corresponding to the test BIOS, and the test BIOS code. In this implementation, the source and the computing device utilize two different key pairs. For example, the command uses a production key pair for the signature and verification, while the test BIOS code uses a test key pair for the signatures and verification. The command is signed by a production private key by the external source, while the test BIOS is signed by a test private key by the external source. The computing device utilizes the corresponding production public key to validate the command and based on this validation, the computing device retrieves the test public key from the command. The computing devices utilizes the test public key to verify the test BIOS signed by the test private key. Thus, the production key pair is different from the test key pair which may be used to validate the boot block and/or the test BIOS code.

FIG. 5 provides updates to BIOS code when the production BIOS may already be installed. This further enables post-production BIOS code development including debugging, internal testing, etc. Installing the test bios to replace the portion of production bios based on the command validation enables updates and/or developments to the BIOS in a secure environment. In this manner, the method provides a front door mechanism to enable installation of test BIOS on the computing device with installed production BIOS. In discussing FIG. 5, references may be made to the components in FIG. 1 to provide contextual examples. For example, the computing device 102 executes operations 502-518 to validate the command for allow the use of the test key for installation of the test BIOS. In another example, the controller 106 as in FIG. 1 executes operations 502-518. Further, although FIG. 5 is described as implemented by the computing device, it may be executed on other suitable components. For example, FIG. 5 may be implemented in the form of executable instructions on a machine-readable storage medium 604 as in FIG. 6.

At operation 502, the computing device receives the command for controlling the use of the test key. The command is sent as a string of data values, characters, and/or references and as such includes the test key as part of the command. In addition to the test key, the command may also be transmitted as part of a data package. As explained earlier, the data package may include the command, boot block corresponding to the test BIOS, and the test BIOS code. The command arrives at the computing device signed with the production key pair, thus once the command is verified using the production key pair, the test public key may be retrieved by the computing device. The command indicates to the controller within the computing device to trust the test key. The command may be validated at operation 504 to signal to the controller to allow the use of the test key. In this implementation, the command includes the test public key which may be signed by the production private key. Thus, upon the cryptographic validation of the command using the production public key corresponding to the production private key enables the computing device to retrieve the test key from the command. This enables the computing device to presently trust the retrieved test public key for authenticating the boot block and/or the test BIOS For example, once the computing device retrieves the test key from the validated command, the test key may be transmitted to an embedded controller within the computing device for use of additional validations. In another implementation, the command includes a system management command and is transmitted by the external source to the computing device. In a further implementation, the test key is transmitted to the embedded controller and the boot block. Operation 502 may be similar in functionality to operations 202, 302, and 402 as in FIGS. 2-4.

At operation 504, the computing device uses the production public key to validate the command received at operation 504. Upon the command validation, the computing device may transmit a signal to the embedded controller to trust the test public key within the command. In this implementation, the embedded controller may verify a boot block of the test BIOS with the retrieved test public key as at operation 512. Operation 504 may be similar in functionality to operations 204, 304, and 404 as in FIGS. 2-4.

At operation 506, if the command validation fails at operation 504, the computing device does not allow the use of the test key. Not allowing the use of the test key leads to a failure of the installation of the test BIOS. Operation 506 may be similar in functionality to operation 306 as in FIG. 3.

At operation 508, upon validation of the command at operation 504, the computing device allows the use of the test key. The test key is used for validating the boot block of the test BIOS at operation 510. As explained earlier, the boot block, test BIOS, and command may be transmitted to the computing device at operation 502. The boot block and the test BIOS may be signed by the external source utilizing the test private key, thus allowing the test public key enables the computing device to validate the boot block and the test BIOS at operation 512. In this implementation, the test public key is used to verify the boot block of the test BIOS at operation 512. In another implementation, the test public key is transmitted as part of the command at operation 502. In this implementation, upon validating the command at operation 504, the computing device may validate the command using the production public key to retrieve the test public key. In a further implementation of operation 508, the computing device transmits the retrieved test public key to the embedded controller for verifying the boot block and the test BIOS using the test public key. Operation 508 may be similar in functionality to operation 310 as in FIG. 3.

At operation 510, the computing device installs the boot block of the test BIOS. The boot block of the test BIOS is validated using the test key at operation 514 upon the reboot of the computing device at operation 512.

At operation 512, the computing device reboots to hand off control to the embedded controller. In this manner, the boot block of the test BIOS is verified at operation 514 to ensure a secure hand off to trusted BIOS updates. In one implementation, the boot block of the test BIOS transmitted at operation 502 is saved to memory prior to the reboot, this ensures the test BIOS is readily available to replace the portion of the production BIOS upon validation. The computing device reboots at operation 512 so the embedded controller may verify the test BIOS including the boot block corresponding to the test BIOS. Upon verification of the boot block of the test BIOS, the embedded controller replaces the corresponding region of the production BIOS with the verified test BIOS.

At operation 514, upon the reboot of the computing device at operation 512, the computing device validates the boot block of the test BIOS. The computing device validates the boot block of the test BIOS using the test key retrieved at operation 508. In one implementation, the test BIOS transmitted at operation 502 includes the boot block of data which may be validated using the test public key retrieved at operation 508. The boot block corresponding to the test BIOS may be sent as update to the production BIOS and as such may be transmitted as a package of data signed by two different keys, the production private key and the test private key. Thus, upon the verification of the signature of the production private key, the computing device obtains the test public key to verify the signature of the boot block and/or test BIOS at the embedded controller. Upon the reboot of the computing device at operation 512, the embedded controller verifies the signature of the boot block corresponding to the test BIOS. The embedded controller may obtain a copy of the boot block and the test BIOS for replacing the production BIOS portions. This enables the embedded controller to trust the test BIOS on subsequent boots. Additionally, upon validation of the boot block at operation 514, the embedded controller may hand off control to a driver execute environment (DXE) which enables the computing device to proceed through a complete boot up. The DXE in turn may hand off control to the operating system.

At operation 516, upon the failure of validating the boot block corresponding to the test BIOS, the computing device does not install the test BIOS. This indicates the boot block is unsecure and as such may be corrupt and/or vulnerable to attacks. Operation 516 may be similar in functionality to operations 206 and 308 as in FIGS. 2-3.

At operation 518, the computing device installs the test BIOS to replace the portion of the production BIOS. The embedded controller may receive the test key based upon the validation of the command at operation 504. The embedded controller may also receive the boot block of the test bios which may be signed by a test private key and transmitted to the computing device with the command. In this operation, the embedded controller may verify the boot block of the test bios with the retrieved test public key. In another operation, upon installing the test BIOS to replace the portion of production BIOS, the computing device may hand off control to the operating system to continue the boot of the computing device. Operation 518 may be similar in functionality to operations 208, 312, and 414 as in FIGS. 2-4.

Figure 6:
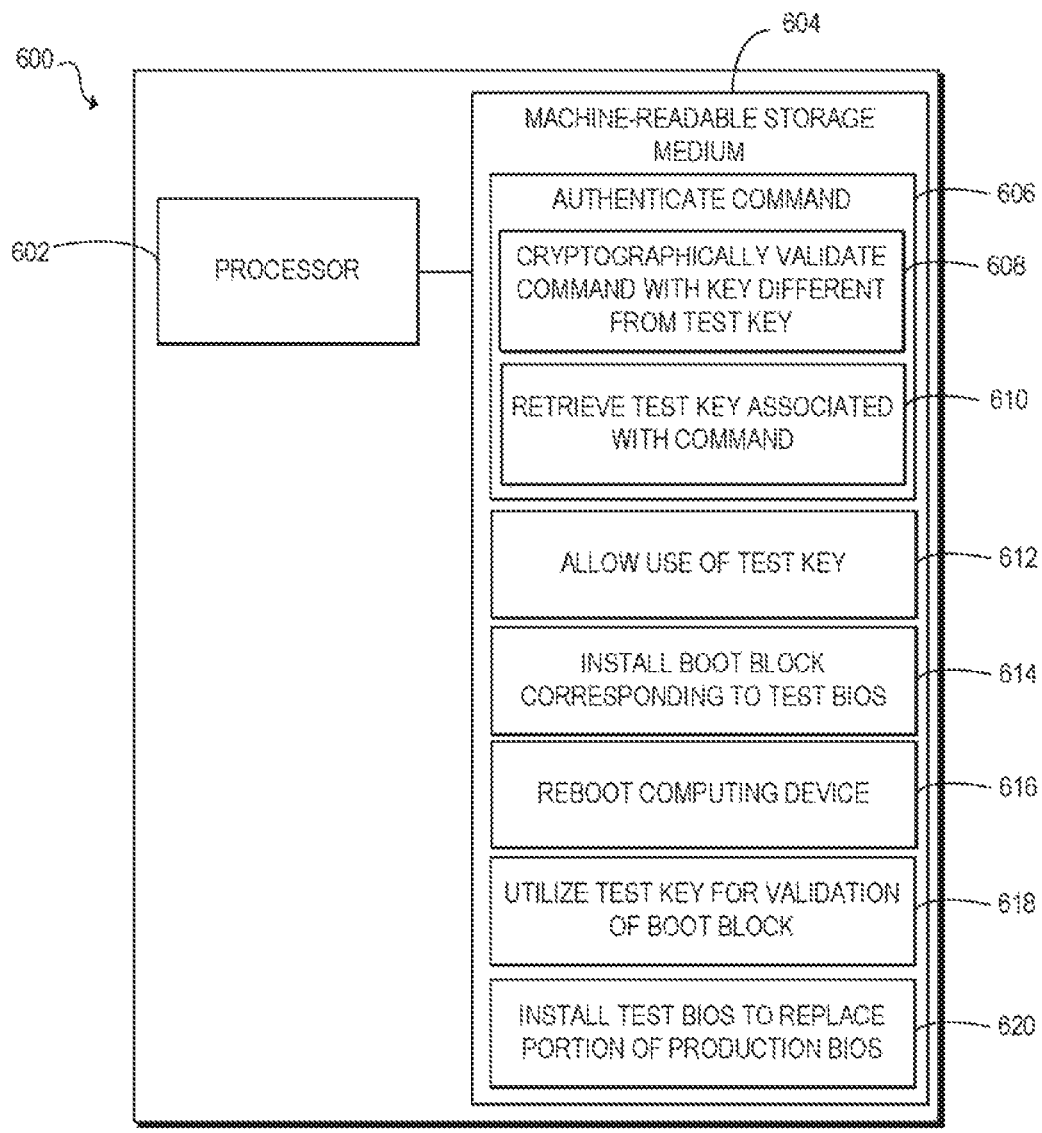
FIG. 6 is a block diagram of an example computing device with a processor to execute instructions in a machine-readable storage medium for authenticating a command through a cryptographic validation to allow a use of a test key, the allowance of the test key enables an installation of a test BIOS to replace at least a portion of a production BIOS.

FIG. 6 is a block diagram of a computing device 600 with a processor 602 to execute instructions 606-618 within a machine-readable storage medium 604. Specifically, the computing device 600 with the processor 602 is to execute instructions 606-620 for authenticating a command through a cryptographic validation to allow a use of a test key and based on the allowance of the test key, install a boot block corresponding to the test BIOS for validation with use of the test key. Additionally, upon the validation of the boot block, a test BIOS replaces at least a portion of a production BIOS. Although the computing device 600 includes processor 602 and machine-readable storage medium 604, it may also include other components that would be suitable to one skilled in the art. For example, the computing device 600 may include the non-volatile memory 112 as in FIG. 1. The computing device 600 is an electronic device with the processor 602 capable of executing instructions 606-620, and as such embodiments of the computing device 600 include a computing device, mobile device, client device, personal computer, desktop computer, laptop, tablet, video game console, or other type of electronic device capable of executing instructions 606-620. The instructions 606-620 may be implemented as methods, functions, operations, and other processes implemented as machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory).

The processor 602 may fetch, decode, and execute instructions 606-620 to authenticate the command to allow the use of the test key for installing the test BIOS. In one implementation, the processor 602 executes instruction 606 through executing instruction 608-610. In another implementation, upon executing instruction 606, the processor 602 executes instruction 612-620. Specifically, the processor 602 executes instructions 606-610 to: authenticate the command by cryptographically validating the command with a key different from the test key; and retrieving the test key upon authentication of the command. In this implementation, the command may be signed with a private key, thus the command may be validated with the corresponding public key. Additionally, in this implementation, the test key may be transmitted as part of the command and thus upon the validation of the command, the test key may be retrieved from the cryptographically validated command. Upon the authentication of the command, the processor 602 may execute instructions 612-620 to: allow the use of the test key based upon the authentication of the command; based on the validation of the command, install the boot block corresponding to the test BIOS; reboot the computing device upon allowing the use of the test key; and utilizing the test key to validate a boot block of the test BIOS; and installing the test BIOS to replace the portion of production BIOS upon the validation of the boot block.

The machine-readable storage medium 604 includes instructions 606-620 for the processor 602 to fetch, decode, and execute. In another embodiment, the machine-readable storage medium 604 may be an electronic, magnetic, optical, memory, storage, flash-drive, or other physical device that contains or stores executable instructions. Thus, the machine-readable storage medium 604 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 604 may include an application and/or firmware which can be utilized independently and/or in conjunction with the processor 602 to fetch, decode, and/or execute instructions of the machine-readable storage medium 604. The application and/or firmware may be stored on the machine-readable storage medium 604 and/or stored on another location of the computing device 600.

In summary, examples disclosed herein provide flexible for installing a test BIOS on a computing device when a production bios is already installed on the computing device. Additionally, examples disclosed herein provide an implementation to validate post-production modifications to the production BIOS for updating, developing, debugging, and/or internal testing of the BIOS.

We claim:

1. A computing device comprising:
a non-volatile memory to store a production basic input output system (BIOS) originally installed within the computing device, the production BIOS having associated therewith a production public key preventing modification of the production BIOS; and
a controller to:
receive a data package including a test BIOS, a test public key associated with the test BIOS, a boot block for the test BIOS, and a command to control use of the test public key for installation of the test BIOS during post-production BIOS code development to one or more of debug and internally test the production BIOS, the test public key different than the production public key and permitting modification of the production BIOS by replacement of at least a portion of the production BIOS with the test BIOS;

validate the command using the production public key associated with the production BIOS by authenticating that the data package was signed by a production private key corresponding to the production public key;

allow the use of the test public key for installation of the test BIOS based on validation of the command using the production public key, the test public key used for installation of the test BIOS by authenticating that the test BIOS was signed by a test private key corresponding to the test public key;

responsive to validating the command and allowing the use of the test public key, install the boot block for the test BIOS;

reboot the computing device after installing the boot block;

authenticating the installed boot block for the test BIOS using the test public key upon the computing device having rebooted; and installing the test BIOS to replace the portion of the production BIOS responsive to authenticating the installed boot block.

2. The computing device of claim 1 wherein the non-volatile memory is to receive and store the test BIOS from the controller to replace at least the portion of the production BIOS.

3. The computing device of claim 1 wherein the production BIOS is installed on the computing device prior to the test BIOS.

4. The computing device of claim 1 wherein the computing device reboots prior to installation of the test BIOS, the installation of the test BIOS replacing at least the portion of the production BIOS.

5. A non-transitory machine-readable storage medium comprising instructions that when executed by a processor of a computing device cause the processor to:

receive a data package including a test basic input output system (BIOS), a test public key associated with the test BIOS, a boot block for the test BIOS, and a command to control use of the test public key for installation of the test BIOS during post-production BIOS code development, the test public key different than the production public key and permitting modification of the production BIOS by replacement of at least a portion of the production BIOS with the test BIOS;

authenticate the command using the production public key associated with the production BIOS by authenticating that the data package was signed by a production private key corresponding to the production public key;

allow the use of the test public key for installation of the test BIOS based on authentication of the command;

responsive to validating the command and allowing the use of the test public key, determine whether the computing device is in a locked programming mode;

responsive to determining that the computing device is in the locked programming mode, validate the boot block for the test BIOS;

install the test BIOS to replace the portion of the production BIOS responsive to validating the boot block.

6. The non-transitory machine-readable storage medium including the instructions of claim 5, wherein the command includes the test key and the test BIOS and wherein the processor is to authenticate the command by:

cryptographically validating the command with the production public key; and retrieve the test key from the command.

7. A method, executable by a computing device, the method comprising:

receiving data package including a test basic input/output system (BIOS), a test public key associated with the test BIOS, a boot block for the test BIOS, and a command to control use of the test public key for installation of the BIOS for the computing device during post-production BIOS code development, the production BIOS having associated therewith a production public key preventing modification of the production BIOS, the test key different than the production public key and permitting modification of the production BIOS by replacement of at least a portion of the production BIOS with the test BIOS;

validating the command using the production public key by authenticating that the data package was signed by a production private key corresponding to the production public key;

allowing the use of the test public key for installation of the test BIOS based on validation of the command using the production public key;

responsive to validating the command and allowing the use of the test public key, installing the boot block for the test BIOS;

rebooting the computing device after installing the boot block;

authenticating the installed boot block for the test BIOS using the test public key upon the computing device having rebooted; and installing the test BIOS to replace at least a portion of a production BIOS responsive to authenticating the installed boot block.

8. The method of claim 7 wherein the command includes the test key and wherein validating the command comprises:

cryptographically validating the command with the production public key.

9. The method of claim 7 further comprising:

allowing the use of the test key based on validation of the command.

10. The method of claim 7 wherein the command includes the test key and wherein installing the test BIOS to replace at least the portion of the production BIOS based on the validation of the command comprises:

allowing use of the test key based on validation of the command;

rebooting the computing device;

validating a boot block of the test bios through the use of the test key; and upon validation of the boot block of the test bios, installing the test BIOS to replace at least the portion of the production BIOS.

11. The method of claim 7 further comprising:

upon validation of the command, determining if the computing device is in a locked programming mode;

upon determination of the device is in the locked programming mode, validating a boot block of the test BIOS with the test key prior to installation of the test BIOS.

12. The method of claim 7 wherein if validation of the command fails, installation of the test BIOS fails.

13. The computing device of claim 1, wherein the production BIOS is validated using the production public key upon initialization.

* * * * *